United States Patent
Han (10) Patent No.: US 7,890,256 B2
(45) Date of Patent: Feb. 15, 2011

(54) MAP IMAGE SCROLLING METHOD AND APPARATUS FOR NAVIGATION SYSTEM

(75) Inventor: Maung Han, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 714 days.

(21) Appl. No.: 11/890,982

(22) Filed: Aug. 8, 2007

(65) Prior Publication Data
US 2009/0043494 A1    Feb. 12, 2009

(51) Int. Cl.
*G01C 21/30* (2006.01)
(52) U.S. Cl. ................. 701/208; 345/684; 345/162; 348/231.2
(58) Field of Classification Search ............ 701/208; 345/162, 684; 348/231.2
See application file for complete search history.

(56) References Cited

U.S. PATENT DOCUMENTS 6,819,356 B1 * 11/2004 Yumoto ............... 348/231.2

2005/0038595 A1 * 2/2005 Yokota et al. ........... 701/200

* cited by examiner

*Primary Examiner*—Mark Hellner
*Assistant Examiner*—Helal A Algahaim
(74) *Attorney, Agent, or Firm*—Muramatsu & Associates (57) ABSTRACT

A map scrolling method and apparatus enables to incrementally tracing back to previous relevant locations of the map image. The method includes the steps of: recording information on a stopped location of a map image every time when a user stops during a map scrolling operation; comparing the recorded information with a predetermined threshold value to determine whether the information satisfies threshold value; recording the stopped location in a memory as a traceable location when the recorded information satisfies the threshold value; and tracing back to the map image of the traceable locations recorded in the memory, one by one, every time when the user presses a cancel key or its equivalent of the navigation system.

20 Claims, 8 Drawing Sheets

MAP IMAGE SCROLLING METHOD AND APPARATUS FOR NAVIGATION SYSTEM

FIELD OF THE INVENTION

This invention relates to a method and apparatus for scrolling map images on a screen of a navigation system, and more particularly, to a method and apparatus for scrolling map images which is able to incrementally tracing back to previous relevant locations of the map image so that a user can easily find a desired location on the map image.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium such as a DVD (digital versatile disc), a hard disc, etc. Typically, the navigation system displays a map image on a monitor screen while superimposing thereon a mark representing the current vehicle location. At an intersection, the navigation system notifies the user which direction to turn at the intersection.

Typically, such a navigation system is designed so that the user is able to scroll the map image to see a map image at a desired location and pin-point such a desired location. For example, a user in a certain state scrolls the map image to search a camping area in the next state, or a user scrolls the map image back and force to find a favorite restaurant in the city he/she is to visit. The map scrolling may be performed by operating any feasible means such as directional keys formed on the panel, remote controller, or touch-screen of the navigation system.

Figure 1A:
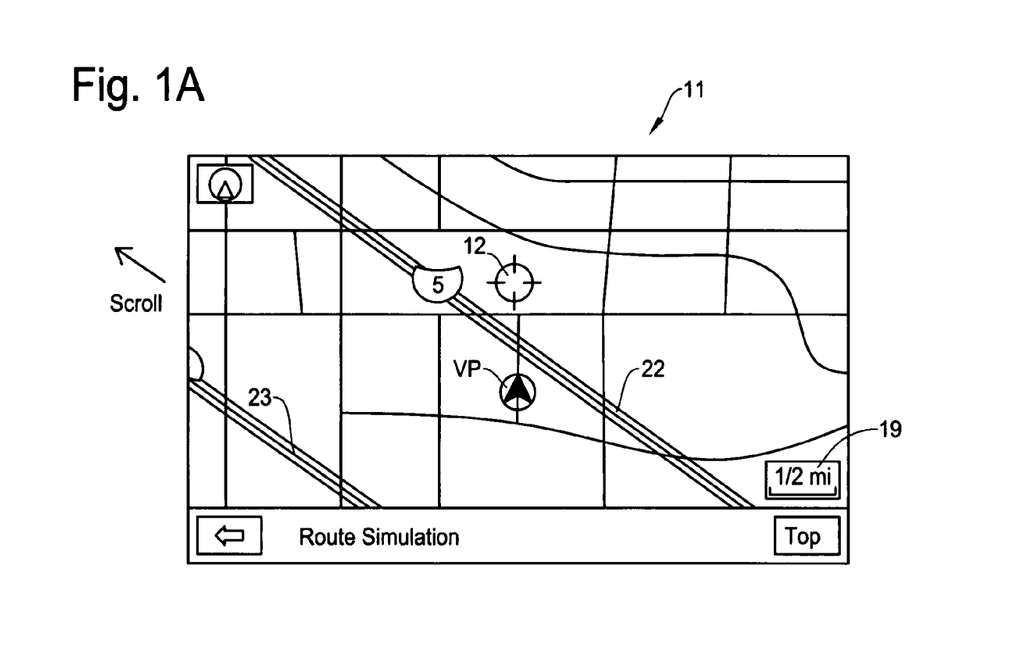
FIGS. 1A and 1B are schematic diagrams showing examples of screen display of the navigation system associated with the map scrolling operation.
Figure 1B:
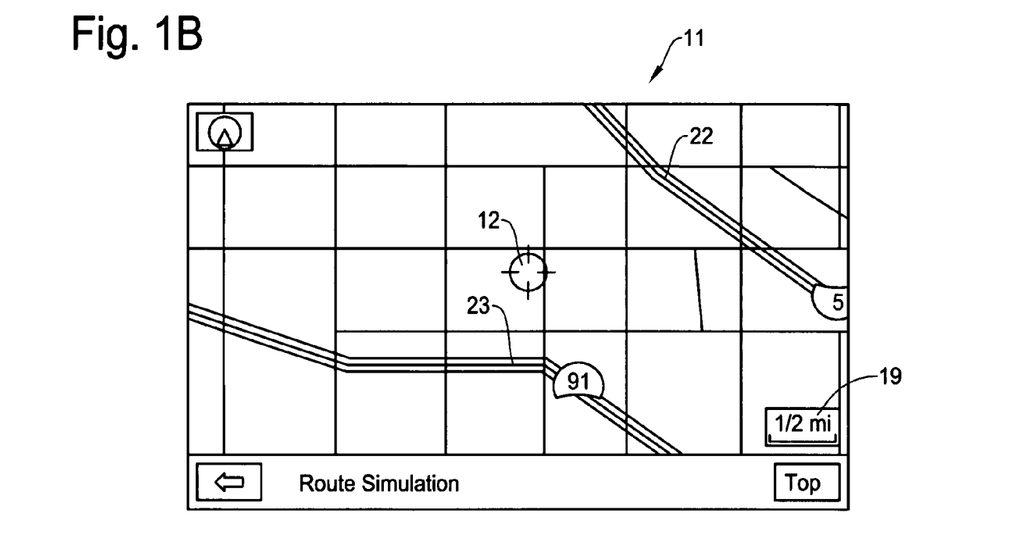

FIGS. 1A and 1B are schematic diagrams showing an example of scrolling process of the map image on the display of the navigation system. In FIGS. 1A and 1B, the screen 11 of the navigation system displays a map image with various roads and indicators. FIG. 1A mainly shows an area with a main road 22 while FIG. 1B mainly shows an area with a main road 23. Although not shown, the user typically scrolls the map image by operating direction keys or a joy-stick of the navigation system.

A vehicle position VP indicates a current vehicle position on the map image, and a map scale indicator 19 shows a map scale of the current map image on the screen. The screen of FIGS. 1A and 1B also shows a cursor 12 which is used to point a desired location on the map image to zoom-in or zoom-out or find information such as icons and address data, etc., associated with the location. The user scrolls the map image of FIG. 1A in an upper left direction as shown by an arrow in the left side of FIG. 1A so that the navigation system changes the location to show the map image of FIG. 1B.

Figure 2A:
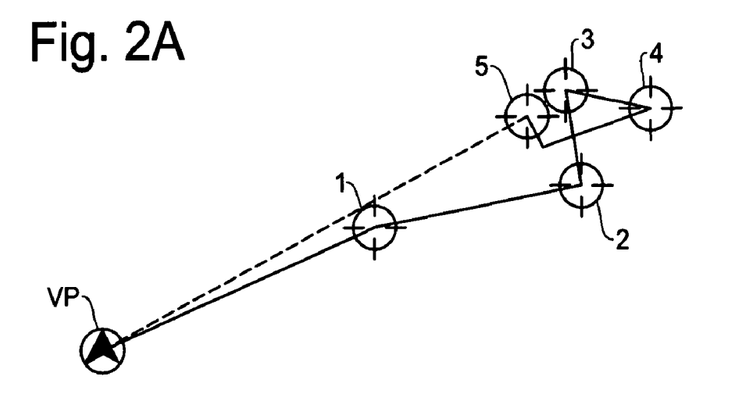
FIGS. 2A and 2B are schematic diagrams showing the scrolling operation to illustrate the problems involved in the conventional navigation system.
Figure 2B:
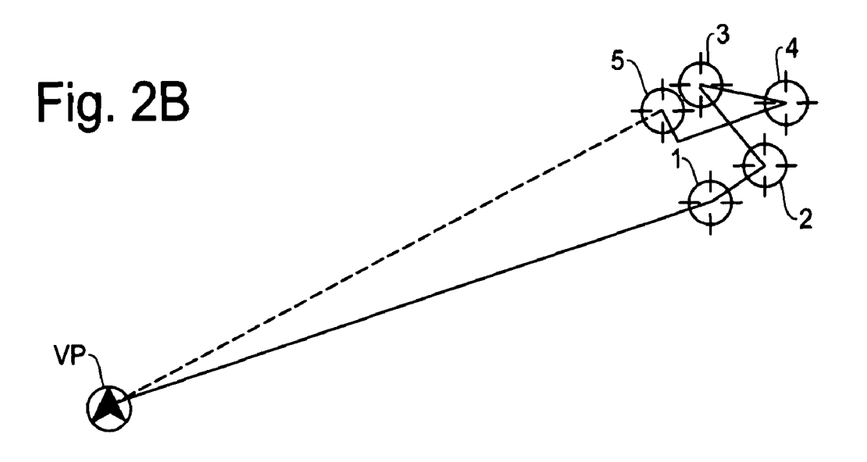

FIGS. 2A and 2B are schematic diagrams showing the scrolling operation to illustrate the problems involved in the conventional navigation system. In the example of FIGS. 2A and 2B, the vehicle position indicator VP indicates the current vehicle position (original position) which is set as a default position on the map image with respect to the map scrolling. The reference numbers 1-5 indicate an order and a position of each movement of the map scrolling. Namely, as the user scrolls the map image, the user has made a first stop at the location represented by the reference number 1. Similarly, the reference number 2 indicates the location of the second stop that the user has made in scrolling the map image.

The reference number 3 indicates the third stop, the reference number 4 indicates the fourth stop, and the reference number 5 indicates the fifth stop. Each line connecting the two locations indicates a path that the user has taken to scroll the map image between the two locations. In the typical navigation system, when the user presses a cancel button or performs its equivalent operation, the map image will snap back to the vehicle position VP.

Thus, in FIGS. 2A and 2B, by pressing the cancel key, the map image is able to quickly return to the original location (vehicle position VP) as indicated by the broken line. When the user no longer wants to continue the map scrolling, this function of quickly returning to the original position may be useful. However, suppose the user was almost successful to find a desired location but accidentally touches the cancel key or its equivalent, the map image snaps back to the original position VP, thus, the user loses the searched location. This is especially harmful, as in the case of FIG. 2B, after the user has taken a long time to find the area which is very far from the vehicle position VP. The user may not remember the area and it may be difficult to come back to the searched area to resume the search.

Thus, there is a need of a new map scrolling method which allows the user to easily view the previously viewed locations again. Moreover, it is desired that the user is able to return, one-by-one, to the previously viewed location that is believed to be relevant to the search in a short period of time.

SUMMARY OF THE INVENTION

It is, therefore, an object of the present invention to provide a method and apparatus for a navigation system for scrolling map images which is capable of incrementally tracing back to previously viewed locations of the map image so that a user can easily return to the previously stopped locations on the map image without losing sight.

It is another object of the present invention to provide a method and apparatus for a navigation system which is capable of evaluating each location where the user has stopped during the map scrolling operation to determine whether such a location should be treated as a traceable location based on predetermined threshold values.

It is a further object of the present invention to provide a method and apparatus for a navigation system which is capable of selecting the traceable locations stored in a traceable location memory to determine whether the traceable location should be replaced with a new traceable location when the traceable location memory is full.

One aspect of the present invention is a method for scrolling map images for a navigation system. The method includes the steps of: recording information on a stopped location of a map image every time when a user stops during a map scrolling operation; comparing the recorded information with a predetermined threshold value to determine whether the information satisfies the threshold value; recording the stopped location in a memory as a traceable location when the recorded information satisfies the threshold value; and tracing back to the map image of the traceable locations recorded in the memory, one by one, every time when the user presses a cancel key or its equivalent of the navigation system.

The method for scrolling map images further includes a step of detecting each stop of the map scrolling operation before the step of recording the information on the stopped location. In the map scrolling method, the recorded information on the stopped location of the map image includes coordinate data of the stopped location and a paused time which is a time length of the stop at the stopped location.

In the map scrolling method, the step of comparing the recorded information includes a step of comparing a predetermined threshold time with the paused time and a step of disqualifying the stopped location as the traceable location when the paused time is shorter than the predetermined threshold time. Further, the step of comparing the recorded information includes a step of comparing a predetermined threshold distance with a distance between a particular stopped location and a previous stopped location and a step of disqualifying the particular stopped location as the traceable location when the distance is shorter than the predetermined threshold distance.

In the map scrolling method, the step of recording the stopped location in the memory as the traceable location includes a step of qualifying a particular stopped location as the traceable location when the paused time is longer than the predetermined threshold time and the distance is longer than the predetermined threshold distance. Further, the step of comparing the predetermined threshold distance with the distance between the particular stopped location and the previous stopped location includes a step of obtaining the distance between the particular stopped point and the previous stopped point based on the coordinate data in the recorded information. In the map scrolling method, the step of tracing back to the map image of the traceable locations includes a step of displaying a cursor point on the map image of the traceable location every time when the map image is traced back.

In the map scrolling method of the present invention, the step of recording the stopped location in the memory as the traceable location includes a step of checking whether the memory storing the traceable locations is full, a step of selecting a traceable location stored in the memory as a candidate of erasable location based on predetermined factors, and a step of replacing the data of the candidate erasable location in the memory with data of a new traceable location.

The above noted predetermined factors for selecting the candidate of erasable location include a distance between two traceable locations in which the traceable location having a shortest distance from the previous traceable location is selected as a candidate erasable location, a farthest distance from a current position in which the traceable location farthest from the current position is selected as a candidate erasable location, and a data retrieval order in which the traceable location occurred most recently is selected as a candidate erasable location.

Another aspect of the present invention is a map scrolling apparatus for a navigation system to evaluate the previously stopped locations and to trace back to the previous location of the map image every time when a cancel key or its equivalent is activated. The map scrolling apparatus is configured by various means for implementing the operational steps incorporated in the map scrolling method described above. The map scrolling apparatus of the present invention enables to easily trace back to previously viewed locations on the map image one by one so that a user can easily search the areas proximate to the previously viewed locations.

According to the map scroll method and apparatus of the present invention, the navigation system snaps back to the previous location where the user has stopped during the map scrolling operation every time when the user presses a cancel key or its equivalent. Such previous locations are evaluated and selected based on the predetermined threshold values, and the selected previous locations are stored in the traceable location memory. Thus, based on the data stored in the traceable location memory, the map scrolling apparatus of the present invention enables to easily trace back to previously viewed locations on the map image one by one so that a user can easily search the areas proximate to the previously viewed locations. Further, the navigation system of the present invention is capable of selecting the traceable locations stored in the traceable location memory to determine whether the traceable location should be replaced with a new traceable location when the traceable location memory is full.

DETAILED DESCRIPTION OF THE INVENTION

The map scroll method and apparatus for the navigation system of the present invention will be described in detail with reference to the accompanying drawings. The map scroll method and apparatus of the present invention is designed to evaluate the previously stopped locations during the map scroll operation and trace back to the previous location of the map image every time when a cancel key or its equivalent is activated. Although the description will be made mainly for a vehicle navigation system, the map scroll method and apparatus of the present invention is also applicable to other types of navigation system such as a portable navigation system, electronic devices having a navigation function such as a cellular phone, a wrist watch, a personal or hand-held computer, etc.

Figure 3:
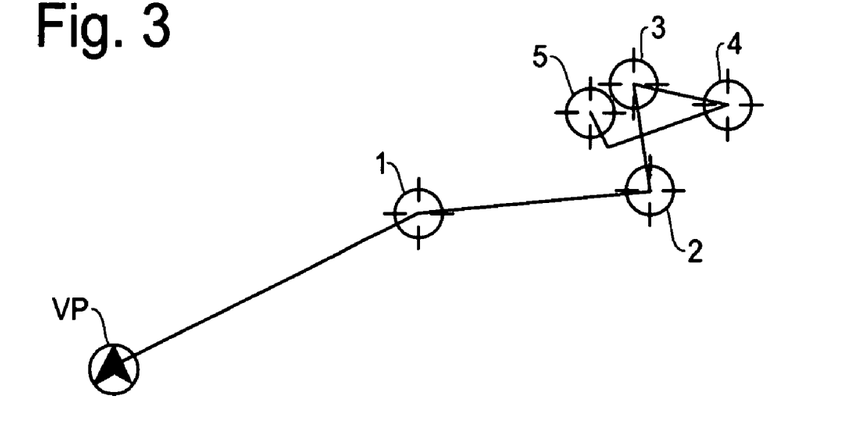
FIG. 3 is a schematic diagram showing a map scrolling process, vehicle position and stopped locations to explain the procedure for determining traceable locations for storing the data of such locations in a traceable location memory under the present invention.

FIG. 3 is a schematic diagram showing an example of the scrolling process, vehicle position and stopped locations during the map scrolling to explain the procedure of the map scroll method of the present invention. As noted above, in the map scroll method and apparatus of the present invention, when the user presses a cancel key, the navigation system snaps back to the previous location where the user has stopped in the map scroll operation. Such previous locations are evaluated and selected, and the selected previous locations are stored in a traceable location memory to snap back thereto.

When the user starts the map scrolling, each time the user stops the scrolling at a certain location on the map image, the navigation system will detect such a stop and record a position, a time length at the stop, etc. Based on the records, the navigation system determines whether this location should be treated as a traceable location and be stored in a traceable location memory. Within the context of the present invention, this method of determination is referred to "traceable location memory criteria".

The schematic diagram of FIG. 3 shows how to determine which locations should be qualified and stored in the traceable location memory under the present invention and which locations should be disqualified therefrom. In the example of FIG. 3, similar to the situation of FIG. 2A, it is assumed that, as the user scrolls the map image, the user has first made a stop at the location represented by the reference number 1. Similarly, the reference number 2 indicates the second stop the user has made in scrolling the map image. The reference number 3 indicates the third stop, the reference number 4 indicates the fourth stop, and the reference number 5 indicates the fifth stop.

Figure 6:
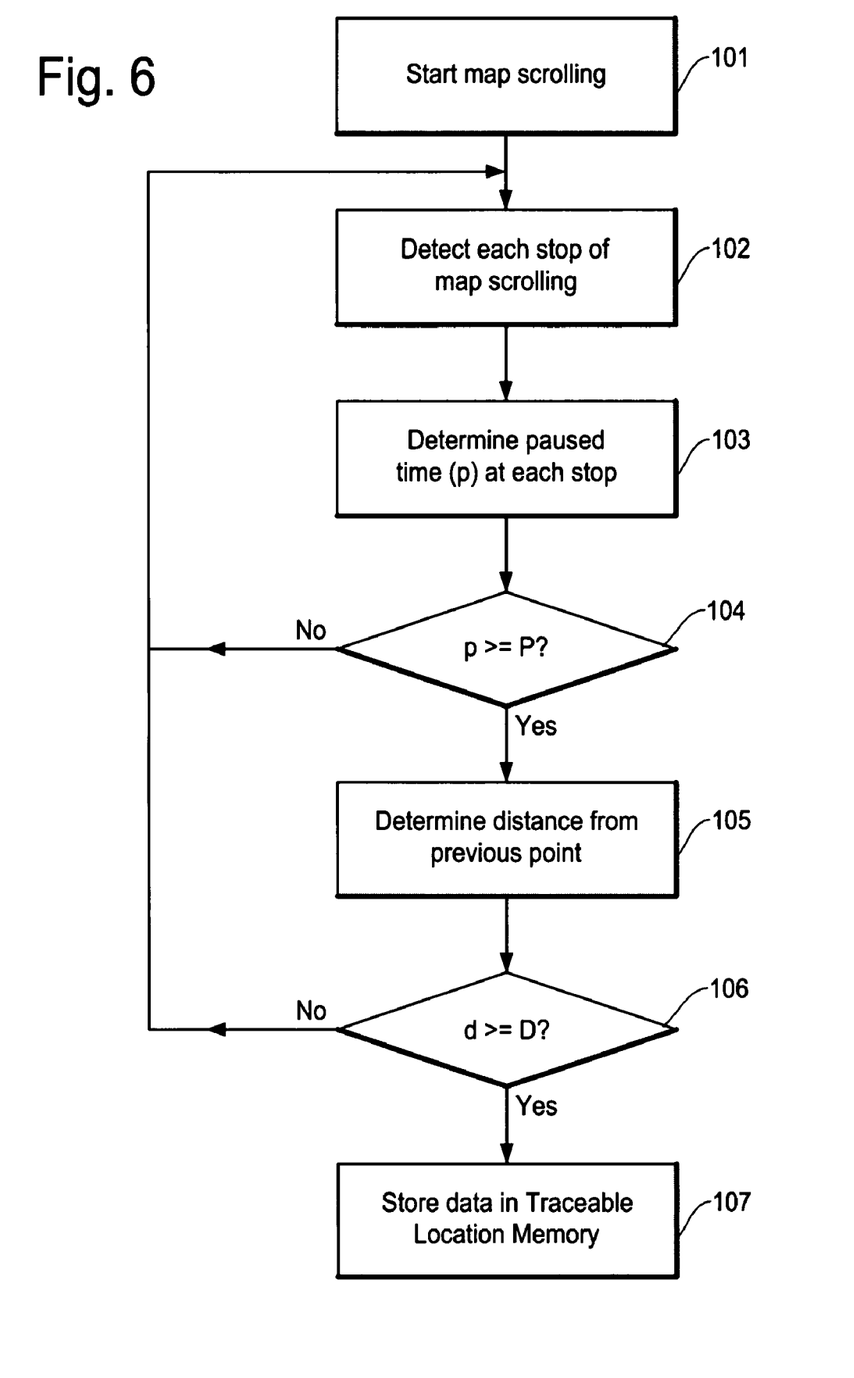
FIG. 6 is a flow chart showing an example of operational steps for determining and storing the traceable locations under the present invention based on the predetermined threshold values.

In the situation of FIG. 3, the operation for determining whether a particular location should be memorized as a traceable location is described with reference FIG. 6. In other words, the flow chart of FIG. 6 shows an example of process for conducting the "traceable location memory criteria" in the present invention. In FIG. 6, the navigation system will first start a map scrolling operation in response to the user's operation of scroll keys in the step 101.

The navigation system detects each stop of the map scrolling operation in terms of location and time length of the stop in the step 102. Then, the navigation system determines a time length of pause, i.e., a paused time p at each location in the step 103. For instance, if the user has stopped at the location indicated by the reference number 1 in FIG. 3 for 0.3 second, the navigation system determines that the paused time p is 0.3 second.

In the step 104, the navigation system will determine if the paused time p is longer than a predetermined threshold time P. The predetermined threshold time P is a time length to determine whether the stop of the map scrolling at a particular location should be treated as a traceable location for the later tracing back process. In other words, the paused time is a first factor to determine whether the stop of the map scroll at a particular location should be qualified as a traceable location.

That is, if the duration of the time paused at a particular location is too short, the navigation system will disqualify the location to be stored, because the user did not consider this location important by quickly moving to other locations. In the case where the predetermined threshold time P is 0.5 seconds, the paused time p of 0.3 second at the location indicated by the reference number 1 (location 1) in the above example is smaller than the predetermined threshold time P. Thus, the navigation system determines that the location 1 is not qualified as a traceable location and disregards the location 1.

As an alternative example, suppose the paused time of the location 1 is larger than the predetermined threshold time P, it is qualified and treated as a traceable location and the process proceeds to the next step. Thus, in the next step 105, the navigation system determines a distance between the current location and the previous location. In the case of the location 1, the distance d from the vehicle position VP to the location 1 is determined because location 1 is the first stop in the map scroll operation.

Next, the distance d obtained based on the position data of the two recorded locations noted above is compared with a predetermined threshold distance D in the step 106. The threshold distance is used as a reference to determine if the location 1 is qualified as a traceable location and is saved in the traceable location memory. In other words, the distance between the two stops is a second factor to determine whether a particular location at which the user has stopped scrolling during the map scroll operation should be qualified and treated as a traceable location.

This is because if the distance between the current location and the previous location is too short, it is unnecessary to store the current location when the previous location is treated as a traceable location to which the map image snaps back. Assuming that the distance d from the vehicle position VP to the location 1 is 1.3 miles and the predetermined threshold distance D is 0.4 miles, the location 1 satisfies the criterion. In the step 107, the navigation system stores the data or information indicating the location 1 in the traceable location memory (FIG. 5), which can be used to track back the map image to the previously viewed locations one by one when the user presses the cancel key or its equivalent.

The above process is conducted for the location indicated by the reference number 2 (location 2) to determine whether the location 2 should be treated as a traceable location. Namely, each stop is detected in the step 102, the paused time p at the location 2 is measured in the step 103 and compared with the predetermined threshold time P in the step 104. If the paused time p at the location 2 is larger than the predetermined threshold time P, the distance d between the location 2 and the location 1 is measured in the step 105 and is compared with the predetermined threshold distance D in the step 106. If both the paused time p and the distance d exceed the predetermined threshold values P and D, respectively, the data or information indicating the location 2 is qualified as a traceable location and is stored in the traceable location memory.

The above process is also conducted for all the other stopped locations. For example, in FIG. 3, assuming that the user stops less than 0.5 seconds at the location indicated by the reference number 3 (location 3), the navigation system does not proceed to the step 105 for the location 3. This is because since the user stops the map scrolling at the location for only a short period of time, it is considered that the location 3 is not an important location where the user is interested in. Thus, the navigation system does not perform the process of FIG. 6 any further for the location 3 and proceeds to evaluate the data on the next location indicated by the reference number 4 (location 4).

As noted above, even though the paused time of a particular location is longer than the predetermined threshold time, if the distance from the previous location is shorter than the predetermined threshold distance D, the navigation system will disqualify the particular location from a traceable location. Thus, the particular location is not stored in the traceable location memory. Accordingly, in the case where the distance d, between the location 4 and the location 5 is shorter than the threshold distance D, the position data of the location 5 is not stored in the traceable location memory when the location 4 is already stored.

In the embodiment described above, the predetermined threshold time T is 0.5 seconds and the predetermined threshold distance D is 0.4 miles. However, such values of the predetermined threshold time T and the predetermined threshold distance D can take other values, such as 1.0 seconds and 1.0 miles, etc. The navigation system also allows the user to freely set the threshold time T and the threshold distance D.

Figure 4:
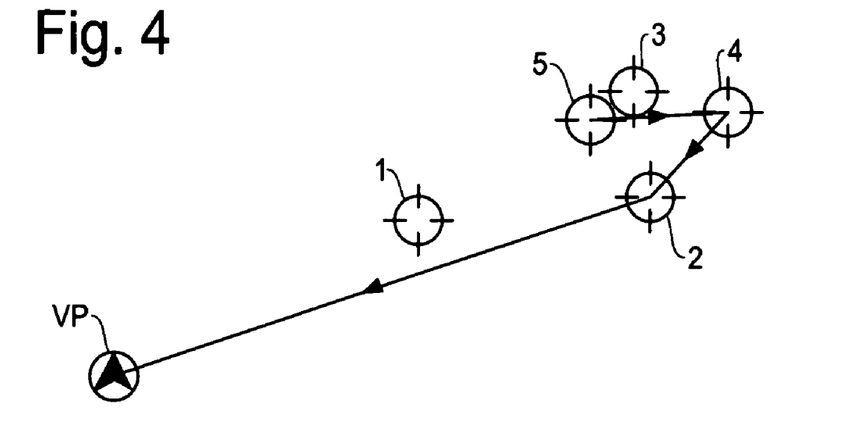
FIG. 4 is a schematic diagram showing a situation similar to that of FIG. 3 to explain the procedure of tracing back to the previously viewed locations under the present invention.

FIG. 4 is a schematic diagram similar to that shown in FIG. 3 to explain the procedure of tracing back previously viewed locations under the present invention with use of the data or information stored in the traceable location memory. The previously viewed locations during the map scrolling are examined in the process described above with reference to FIGS. 3 and 6 and the data on the traceable locations are stored in the traceable location memory. When the user presses a cancel key or its equivalent, the locations on the map image will snap back to the previously stopped locations that are stored in the traceable location memory 75 in the manner shown in FIG. 4 where such locations are indicated by cursor points.

Figure 5:
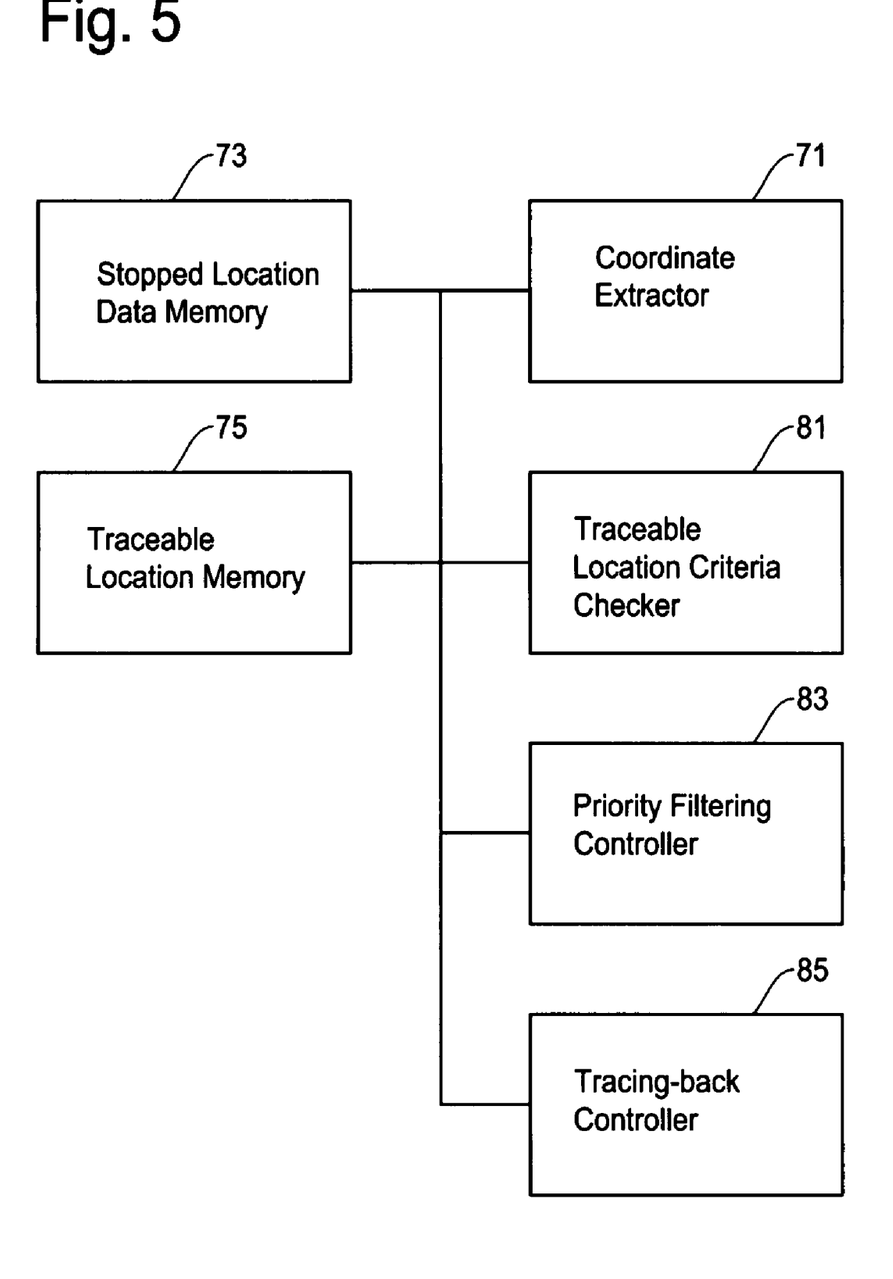
FIG. 5 is a functional block diagram showing an example of structure for implementing the map scroll method and apparatus of the present invention.

Before describing the snapping back operation of FIG. 4 in detail, an example of functional structure of the map scroll apparatus of the present invention is described with reference to FIG. 5. A functional block diagram of FIG. 5 shows basic functional components involved in the map scroll apparatus implemented in the navigation system of the present invention. The block diagram of FIG. 5 includes a coordinate extractor 71, a temporary memory (stopped location data memory) 73, a traceable location memory 75, a traceable location criteria checker 81, a filtering controller (priority filtering controller) 83, and a tracking-back controller 85. In an example of vehicle navigation system of FIG. 9, the temporary memory 73 and the traceable location memory 75 may be implemented by a RAM 141 or a buffer memory 148, and the coordinate extractor 71, the traceable location criteria checker 81, the filtering controller 83, and the tracking-back controller 85 may be implemented by a CPU 139.

The coordinate extractor 71 extracts the coordinate data (recorded information) indicating the location of each stop on the map image when the user stops at any location on the map image during the map scrolling operation. The temporary memory 73 temporarily stores the coordinate data of the stopped location and time data indicating a time length of the stop (paused time). The data (recorded information) in the temporary memory 73 are used to determine whether the location is to be stored in the traceable location memory 75 through the "traceable location memory criteria" process described above with reference to the flow chart of FIG. 6.

The traceable location memory 75 stores the location information such as the coordinate data of only the traceable locations among the previously stopped locations during the map scroll operation. The traceable location memory criteria checker 81 checks whether a particular stopped location should be treated as a traceable location to be stored in the traceable location memory 75 through the process described with reference to FIGS. 3 and 6 by comparing the data from the temporary memory 73 with predetermined threshold values. The filtering controller 83 erases the old traceable location with the new data when the traceable location memory 75 becomes full based on the predetermined factors, which will be explained in detail with reference to the flow chart of FIG. 8.

The tracking-back controller 85 tracks back previously viewed locations based on the data from the traceable location memory 75. As noted above, the location of the map image snaps back to the previous location at which the user has stopped the map scrolling operation each time the cancel key or its equivalent is activated by the user. Because the navigation system traces back to the previous position one by one, rather than immediately goes back to the current vehicle position VP, the user can easily return to the previously searched area without loosing sight.

Figure 7:
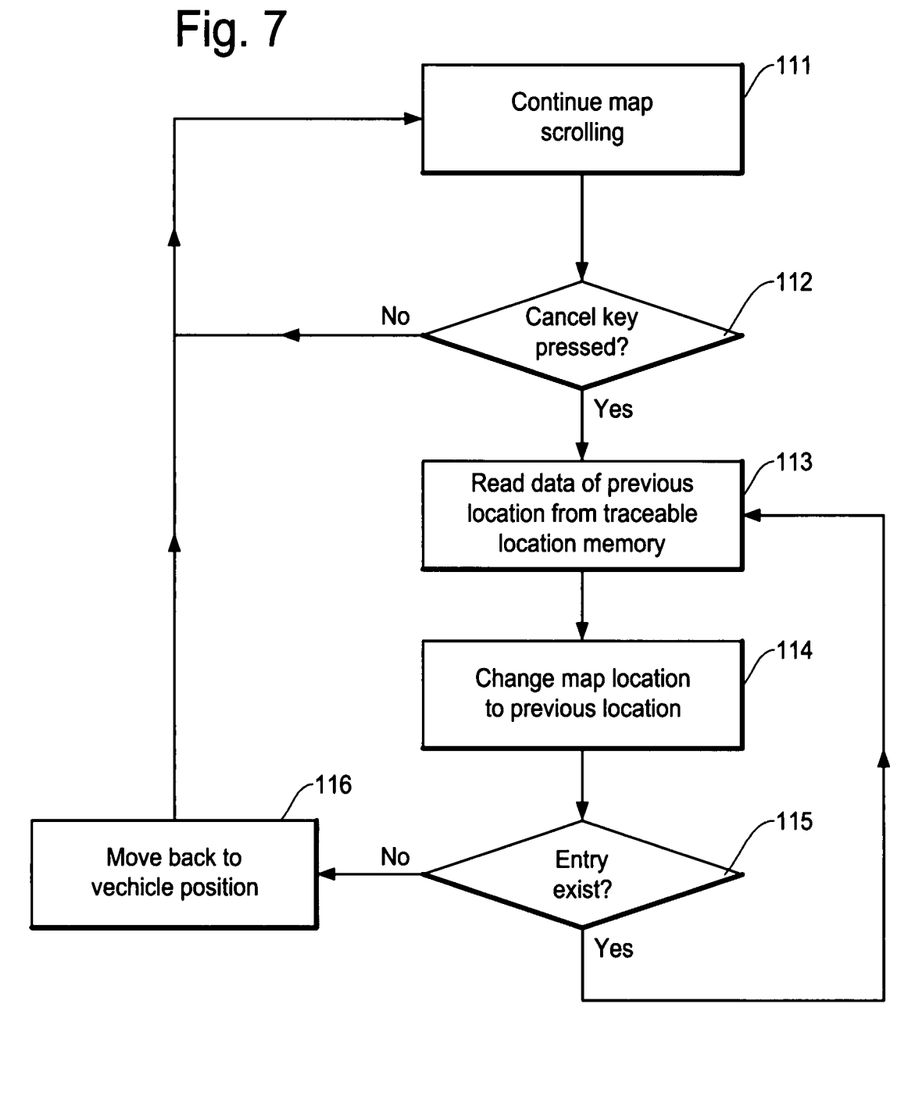
FIG. 7 is a flow chart showing an example of overall operational steps for tracing back to the previously viewed locations under the present invention with use of the data stored in the traceable location memory.

The snap back operation will be described in detail with reference to the schematic diagram of FIG. 4 and the flow chart of FIG. 7. FIG. 4 shows a situation similar to that shown in FIG. 3 with respect to the viewed locations where the user has stopped during the map scroll operation. However, FIG. 4 shows a situation where the navigation system has determined that only the location 1 is not treated as a traceable location while all the other locations 2-5 are traceable locations.

In the present invention, typically, the location indicated by a cursor point on the map image snaps back to previously viewed locations one by one with use of the data stored in the traceable location memory 75 at the timing of the cancel key. FIG. 7 is a flow chart showing the steps of tracing or snapping back to the viewed points or locations in an embodiment of the present invention. The step 111 shows the situation where the user is conducting the map scroll operation.

In the step 112, the navigation system checks whether the user presses a cancel key or its equivalent. In the step 112, if it is determined that there is no activation of the cancel key, the process goes back to the step 111 to repeat the procedure of the steps 111 and 112. After viewing the several locations such as location 1, 2, 3, 4 and 5 in FIG. 4, it is assumed that the user presses the cancel key. Then, the navigation system detects that the cancel key is used and moves to the step 113.

Then, in the step 113, the navigation system reads the data on the traceable location which is the most recent to the current location on the map image from the traceable location memory 75 shown in FIG. 5. Namely, in the example of FIG. 4, since the user has activated the cancel key after stopping the location 5, the data concerning the location 4 is retrieved from the traceable location memory 75 since the location 4 is the stop most recent to the location 5. Based on the data such as coordinate data indicating the location 4, in the step 114, the navigation system changes the map image to the location 4 to which the cursor is pointing on the map image.

In this manner, every time when the user presses the cancel key, the map image on the screen snaps back to the previous traceable location recorded in the traceable location memory 75. In the step 115, the navigation system determines whether there still remains any entry in the traceable location memory 75. If there is no entry of the traceable location in the step 115, the map image returns to the vehicle position VP in the step 116 at the timing when the user presses the cancel key. In the step 115, if there still exist traceable locations in the traceable location memory 75, the process goes back to the step 113 to repeat the procedure of the steps 113-115.

Therefore, in the example of FIG. 4, the map location moves back from the location 5 to the location 4 by the first click of the cancel key, then snaps back to the location 3 by the second click of the cancel key, and snaps back to the location 2 by the third click of the cancel key. As noted above, in the example of FIG. 4, the location 1 is not qualified as the traceable location and thus not recorded in the traceable location memory 75 because its paused time p is shorter than the threshold time P. Thus, by the fourth click of the cancel key, the map location directly goes back to the vehicle position VP from the location 2.

The above procedure will be repeated as the user scrolls the map image and stops at two or more locations and presses the cancel key. Preferably, the map scroll method and apparatus of the present invention is designed so that the user may choose to cancel the tracing back operation if the user so desires. For example, the navigation system may be set so that if the user keeps pressing the cancel key for a certain amount of time, such as more than two seconds, the tracing-back function is disabled and the user can go back to the vehicle position VP directly.

Figure 8:
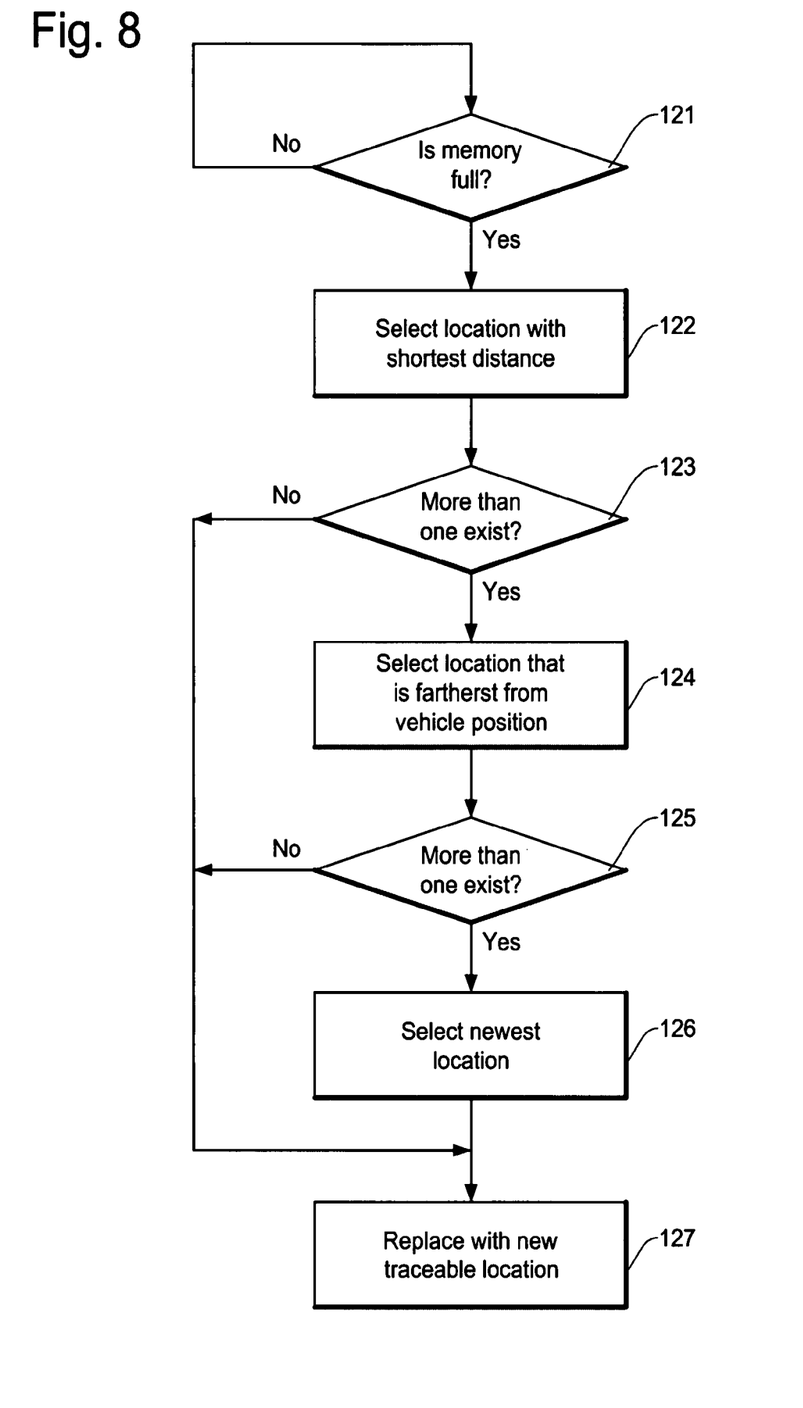
FIG. 8 is a flow chart showing an example of operational steps for priority filtering under the present invention for replacing the data stored in the traceable location memory with new data.

When the traceable location memory 75 becomes full after storing the data of the traceable locations in the manner described above with reference to FIGS. 3 and 6, the navigation system will erase the data therein to create a space for storing the data for new traceable locations. The flow chart of FIG. 8 shows an example of the process for replacing the old data with new data in the traceable location memory 75 under the present invention. The operation of the flow chart of FIG. 8 will be mainly conducted by the filtering controller 83 shown in the functional block of FIG. 5.

In the step 121, the navigation system checks whether the traceable location memory 75 is full. If the traceable location memory 75 is full, in the step 122, the navigation system searches the entry (traceable location) in the traceable location memory 75 that has the shortest distance from the previous location as a candidate of erasable entry. This is because the traceable location that is shortest from the previous location is not considered very important and can be erased since the map image still can trace back to the previous location that is close to the erased location.

Next, in the step 123, the navigation system will check if there are more than one such entries with the same shortest distance. If there is only one such entry (traceable location), the navigation system moves to the step 127 to delete this traceable location and write the data on the new traceable location in the traceable location memory 75. Thus, the old data in the traceable location memory 75 is replaced with the new data showing the traceable location stopped during the map scrolling.

If there are two or more traceable locations having the same shortest distance, the navigation system will pick the stopped location that is farthest from the vehicle position VP in the step 124 as a candidate of erasable entry. This is because the farthest location is considered less important than the other locations for the user since the user has changed to the locations more closer to the current vehicle position VP. In other words, the navigation system judges that the stopped location that is farthest from the initial location (vehicle position VP) is not the location that the user was interested in because the user has changed to the closer locations.

In the step 125, the navigation system will determine if there are more than one traceable locations that are farthest from the vehicle position VP, i.e., the same farthest distance from the vehicle position VP. If there is only one such entry (traceable location), the navigation system moves to the step 127 to delete this traceable location and write the data on the new traceable location in the traceable location memory 75. Thus, the data showing the farthest location in the traceable location memory 75 will be replaced with the new data showing the traceable location stopped during the map scrolling.

If there are two or more traceable locations having the farthest distance, the navigation system will pick the newest stopped location in the step 126 as a candidate of erasable entry, i.e, based on an order of data acquisition in the traceable location memory 75. This is because the stopped location that occurred most recently is less important than the other locations for the user since the user presses the cancel key after stopping the most recent location. Thus, in the step 127, the data showing the traceable location that satisfies the above noted conditions (steps 122, 124 and 126) in the traceable location memory 75 will be replaced with the new data showing the traceable location associated with the map scrolling operation.

The number of the entries (traceable locations) that can be stored in the traceable location memory 75 may be determined by a capacity of available memory, or may be a preset number of entries such as 20 entries. As described above, since the data showing the traceable locations are stored in the traceable location memory 75, the user is able to take advantage of the stored locations to trace back to the previously viewed points on the map image. Thus, the user can easily go back to the location where the user was almost successful to find a desired location and takes a closer look at the nearby area on the map image.

Figure 9:
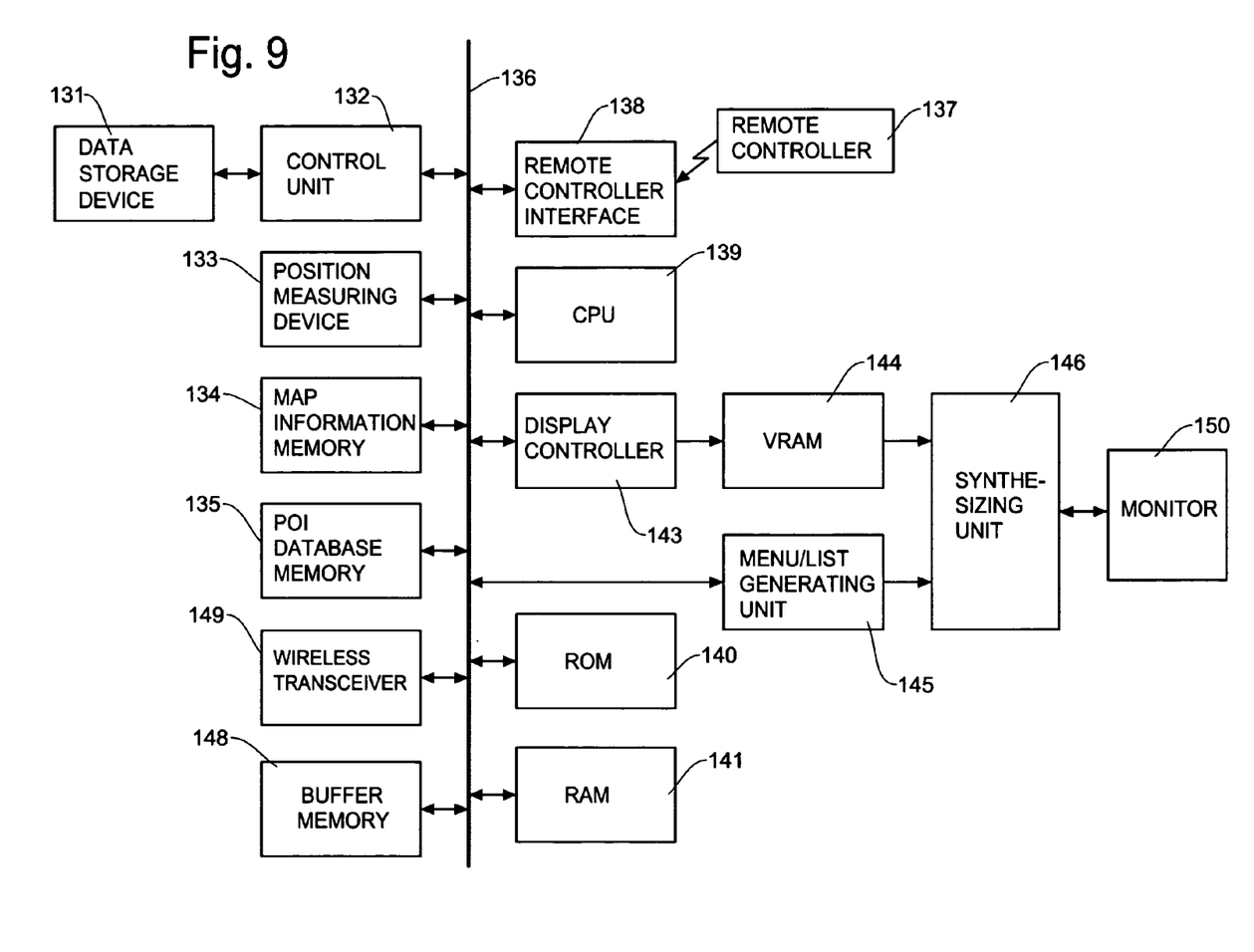
FIG. 9 is a functional block diagram showing a basic structure of an electronic device having a navigation function and implementing the present invention.

FIG. 9 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 131 such as a hard disc, CD-ROM, DVD or other storage means for storing the map data. The navigation system includes a control unit 132 for controlling an operation for reading the information from the data storage medium 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving GPS signals from satellites and determining an absolute position of the vehicle, and etc.

The block diagram of FIG. 9 further includes a map information memory 134 for storing the map information which is read from the data storage 131, a database memory 135 for storing database information such as point of interest (POI) information which is read out from the data storage medium 131, a remote controller 137 for executing a menu selection operation, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller. A cancel button or its equivalent to trace back the previously viewed places may be provided to the remote controller interface 138.

In FIG. 9, the navigation system further includes a bus 136 for interfacing the above units in the system, a processor (CPU) 139 for controlling an overall operation of the navigation system, a ROM 140 for storing various control programs such as a route search program and a map matching program necessary for navigation control, a RAM 141 for storing a processing result such as a guide route, a display controller 143 for generating map image (a map guide image and an arrow guide image) on the basis of the map information, a VRAM 44 for storing images generated by the display controller 143, a menu/list generating unit 145 for generating menu image/various list images, a synthesizing unit 146, a wireless transceiver 149 for wireless communication to retrieve data from a remote server, a buffer memory 148 for temporally storing data for ease of data processing, and a monitor (display) 150. Typically, the CPU 39 executes the procedures of the map scroll method of the present invention described with reference to the flow charts of FIGS. 6, 7 and 8.

As has been described above, according to the map scroll method and apparatus of the present invention, the navigation system snaps back to the previous location where the user has stopped during the map scrolling operation every time when the user presses a cancel key or its equivalent. Such previous locations are evaluated and selected based on the predetermined threshold values, and the selected previous locations are stored in the traceable location memory. Thus, based on the data stored in the traceable location memory, the map scrolling apparatus of the present invention enables to easily trace back to previously viewed locations on the map image one by one so that a user can easily search the areas proximate to the previously viewed locations. Further, the navigation system of the present invention is capable of selecting the traceable locations stored in the traceable location memory to determine whether the traceable location should be replaced with a new traceable location when the traceable location memory is full.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for scrolling map images for a navigation system, comprising the following steps of:
   starting a map scrolling operation on a monitor screen of the navigation system;
   recording information on a stopped location of a map image at which a user stops the map scrolling operation;
   comparing the recorded information with a predetermined threshold value to determine whether the information satisfies threshold value;
   recording the stopped location in a memory as a traceable location when the recorded information satisfies the threshold value; and
   tracing back to the map image of the traceable locations recorded in the memory, one by one, every time when the user presses a cancel key or its equivalent of the navigation system.

2. A method for scrolling map images as defined in claim 1, further comprising a step of detecting each stop of the map scrolling operation before the step of recording the information on the stopped location.

3. A method for scrolling map images as defined in claim 1, wherein said recorded information on the stopped location of the map image includes coordinate data of the stopped location and a paused time which is a time length of the stop at the stopped location.

4. A method for scrolling map images as defined in claim 3, wherein said step of comparing the recorded information includes a step of comparing a predetermined threshold time with the paused time and a step of disqualifying the stopped location as the traceable location when the paused time is shorter than the predetermined threshold time.

5. A method for scrolling map images as defined in claim 4, wherein said step of comparing the recorded information includes a step of comparing a predetermined threshold distance with a distance between a particular stopped location and a previous stopped location and a step of disqualifying the particular stopped location as the traceable location when the distance is shorter than the predetermined threshold distance.

6. A method for scrolling map images as defined in claim 5, wherein said step of recording the stopped location in the memory as the traceable location includes a step of qualifying a particular stopped location as the traceable location when the paused time is longer than the predetermined threshold time and the distance is longer than the predetermined threshold distance.

7. A method for scrolling map images as defined in claim 5, wherein said step of comparing the predetermined threshold distance with the distance between the particular stopped location and the previous stopped location includes a step of obtaining the distance between the particular stopped point and the previous stopped point based on the coordinate data in the recorded information.

8. A method for scrolling map images as defined in claim 1, wherein said step of tracing back to the map image of the traceable locations includes a step of displaying a cursor point on the map image of the traceable location every time when the map image is traced back.

9. A method for scrolling map images as defined in claim 1, wherein said step of recording the stopped location in the memory as the traceable location includes a step of checking whether the memory storing the traceable locations is full, a step of selecting a traceable location stored in the memory as a candidate of erasable location based on predetermined factors, and a step of replacing the data of the candidate erasable location in the memory with data of a new traceable location.

10. A method for scrolling map images as defined in claim 9, wherein said predetermined factors include a distance between two traceable locations in which the traceable location having a shortest distance from the previous traceable location is selected as a candidate erasable location, a farthest distance from a current position in which the traceable location farthest from the current position is selected as a candidate erasable location, and a data retrieval order in which the traceable location recorded most recently is selected as a candidate erasable location.

11. An apparatus for scrolling map images for a navigation system, comprising:
    means for starting a map scrolling operation on a monitor screen of the navigation system;
    means for recording information on a stopped location of a map image at which a user stops the map scrolling operation;
    means for comparing the recorded information with a predetermined threshold value to determine whether the information satisfies threshold value;
    means for recording the stopped location in a memory as a traceable location when the recorded information satisfies the threshold value; and
    means for tracing back to the map image of the traceable locations recorded in the memory, one by one, every time when the user presses a cancel key or its equivalent of the navigation system.

12. An apparatus for scrolling map images as defined in claim 11, further comprising means for detecting each stop of the map scrolling operation before recording the information on the stopped location.

13. An apparatus for scrolling map images as defined in claim 11, wherein said recorded information on the stopped location of the map image includes coordinate data of the stopped location and a paused time which is a time length of the stop at the stopped location.

14. An apparatus for scrolling map images as defined in claim 13, wherein said means for comparing the recorded information includes means for comparing a predetermined threshold time with the paused time and means for disqualifying the stopped location as the traceable location when the paused time is shorter than the predetermined threshold time.

15. An apparatus for scrolling map images as defined in claim 14, wherein said means for comparing the recorded information includes means for comparing a predetermined threshold distance with a distance between a particular stopped location and a previous stopped location and means for disqualifying the particular stopped location as the traceable location when the distance is shorter than the predetermined threshold distance.

16. An apparatus for scrolling map images as defined in claim 15, wherein said means for recording the stopped location in the memory as the traceable location includes means for qualifying a particular stopped location as the traceable location when the paused time is longer than the predetermined threshold time and the distance is longer than the predetermined threshold distance.

17. An apparatus for scrolling map images as defined in claim 15, wherein said means for comparing the predetermined threshold distance with the distance between the particular stopped location and the previous stopped location includes means for obtaining the distance between the particular stopped point and the previous stopped point based on the coordinate data in the recorded information.

18. An apparatus for scrolling map images as defined in claim 11, wherein said means for tracing back to the map image of the traceable locations includes means for displaying a cursor point on the map image of the traceable location every time when the map image is traced back.

19. An apparatus for scrolling map images as defined in claim 11, wherein said means for recording the stopped location in the memory as the traceable location includes means for checking whether the memory storing the traceable locations is full, means for selecting a traceable location stored in the memory as a candidate of erasable location based on predetermined factors, and means for replacing the data of the candidate erasable location in the memory with data of a new traceable location.

20. An apparatus for scrolling map images as defined in claim 19, wherein said predetermined factors include a distance between two traceable locations in which the traceable location having a shortest distance from the previous traceable location is selected as a candidate erasable location, a farthest distance from a current position in which the traceable location farthest from the current position is selected as a candidate erasable location, and a data retrieval order in which the traceable location occurred most recently is selected as a candidate erasable location.

* * * * *